United States Patent
Arahara

[11] Patent Number: 5,378,516
[45] Date of Patent: Jan. 3, 1995

[54] THIN TYPE OPTICAL MEMORY MEDIUM AND METHOD FOR PREPARING THE SAME

[75] Inventor: Kohzoh Arahara, Tokyo, Japan

[73] Assignee: Canon Kabushiki Kaisha, Tokyo, Japan

[21] Appl. No.: 928,322

[22] Filed: Aug. 12, 1992

Related U.S. Application Data

[60] Division of Ser. No. 473,106, Feb. 2, 1990, Pat. No. 5,160,462, which is a continuation of Ser. No. 14,785, Feb. 13, 1987, abandoned.

[30] Foreign Application Priority Data

| Feb. 14, 1986 | [JP] | Japan | 61-028903 |
| Feb. 14, 1986 | [JP] | Japan | 61-028904 |
| Feb. 14, 1986 | [JP] | Japan | 61-028905 |
| Feb. 15, 1986 | [JP] | Japan | 61-029884 |
| Feb. 15, 1986 | [JP] | Japan | 61-029885 |
| Feb. 15, 1986 | [JP] | Japan | 61-029886 |

[51] Int. Cl.$^6$ .................................. B32B 3/00
[52] U.S. Cl. .......................... 428/64; 428/65; 428/913; 430/945; 346/76 L; 346/135.1
[58] Field of Search ........ 428/64, 65, 457, 913; 430/945; 346/76 L, 135.1; 369/288

[56] References Cited

U.S. PATENT DOCUMENTS

| 3,768,946 | 10/1973 | Matuschke | 264/106 |
| 4,179,532 | 12/1979 | Soeding | 264/107 |
| 4,407,880 | 10/1983 | Terao | 264/106 |
| 4,447,381 | 5/1984 | Matey | 264/107 |
| 4,477,328 | 10/1984 | Broeksema | 264/107 |
| 4,519,065 | 5/1985 | Lewis et al. | 369/275 |
| 4,571,314 | 2/1986 | Suzuki et al. | 264/1.7 |
| 4,615,753 | 10/1986 | Gregg | 156/219 |
| 4,619,804 | 10/1986 | Leonard | 264/1.3 |
| 4,637,904 | 1/1987 | Rounds | 264/107 |
| 4,657,714 | 4/1987 | Kenmochi et al. | 264/107 |
| 4,658,392 | 4/1987 | Langowski et al. | 369/288 |
| 4,659,407 | 4/1987 | Lacotte | 264/107 |
| 4,729,938 | 3/1988 | Tajima et al. | 430/272 |
| 4,788,015 | 11/1988 | Sakai et al. | 264/107 |
| 4,810,435 | 3/1989 | Kamada et al. | 264/106 |
| 4,845,000 | 7/1989 | Takeoka et al. | 264/107 |
| 4,906,498 | 3/1990 | Ichikawa et al. | 428/64 |
| 4,961,979 | 10/1990 | Iida et al. | 428/64 |

FOREIGN PATENT DOCUMENTS

| 58-38125 | 3/1983 | Japan | 264/106 |
| 0145120 | 8/1984 | Japan | 264/1.1 |

Primary Examiner—Patrick J. Ryan
Assistant Examiner—Elizabeth Evans
Attorney, Agent, or Firm—Fitzpatrick, Cella, Harper & Scinto

[57] ABSTRACT

An optical memory medium comprises a heat-resistant sheet a plastic resin layer having an uneven guide groove on the heat-resistant sheet, and an optical recording layer on the plastic resin layer. A method for preparing an optical memory medium comprises forming an uneven guide groove on a plastic resin existing directly or through another layer on a heat-resistant sheet, and laminating an optical recording layer on the surface of the resin layer having said uneven guide groove.

9 Claims, 4 Drawing Sheets

THIN TYPE OPTICAL MEMORY MEDIUM AND METHOD FOR PREPARING THE SAME

This application is a division of application Ser. No. 07/473,106 filed Feb. 2, 1990, now U.S. Pat. No. 5,160,462, which in turn is a continuation of application Ser. No. 07/014,78.5 filed Feb. 13, 1987, now abandoned.

BACKGROUND OF THE INVENTION

1. Field of the Invention

This invention relates to an optical memory medium and a method for preparing the same, particularly a grooved optical memory medium such as flexible optical disc, etc. and a method for preparation thereof.

Further, the present invention relates to a thin type disc and a method for preparing the same, particularly a thin type high density information recording disc such as flexible video disc, etc., or a grooved optical information recording substrate and a method for preparation thereof.

2. Related Background Art

Preparation of a thin type optical memory medium of the prior art has been practiced by first molding a substrate of a thermoplastic resin such as polymethyl methacrylate, polycarbonate, etc., by injection molding or compression molding into the state in which an uneven guide groove is provided on the surface, and then laminating an optical recording layer on the substrate.

On the other hand, a high density information recording disc has been prepared by molding a thermoplastic resin such as polymethyl methacrylate, polycarbonate, etc., by injection molding or compression molding into the state in which an unevenness for signals is provided on the surface, followed by cooling and solidification.

Figure 16:
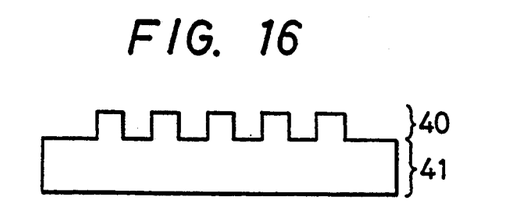
FIG. 16 is a sectional view of a substrate molded according to injection molding method.

According to such methods, it has been difficult to make the medium of a thin type, and an optical memory medium with a thickness of 1.0 mm or less could be prepared only with substantial difficulty. This has been primarily because of the fact that, as shown in FIG. 16, the substrate can only could be molded with difficulty for such problems as strength, etc., unless the thickness of the base portion 41 beneath the uneven guide groove portion 40 is made considerably thicker relative thereto.

SUMMARY OF THE INVENTION

The present invention has been accomplished in view of the problems as mentioned above, and its object is to provide a flexible optical disc with a thickness of 1.0 mm or less, etc., and a method for preparing the same more easily than in the prior art.

According to one aspect of the present invention, there is provided an optical memory medium comprising a heat-resistant sheet, a plastic resin layer having an uneven guide groove on the heat-resistant sheet, and an optical recording layer on the plastic resin layer.

According to another aspect of the present invention, there is provided a method for preparing an optical memory medium which comprises forming an uneven guide groove on a plastic resin existing directly or through another layer on a heat-resistant sheet, and laminating an optical recording layer on the surface of the resin layer having said uneven guide groove.

According to a further aspect of the present invention, there is provided a method for preparing a thin type disc which comprises spreading a resin in a plastic state directly or through another layer onto the respective outer surfaces of heat-resistant sheets comprising two sheets superposed on each other and adhering the resin with solidification onto the heat-resistant sheets while forming by transfer an unevenness for signal onto said resin.

According to still another aspect of the present invention, there is provided a method for preparing a thin type disc which comprises laminating on the respective outer surfaces of two sheets of heat-resistant sheets, directly or through another layer, a resin having a lower heat deformation temperature than said heat-resistant sheet to form two laminated sheets, superposing both of said laminated sheets so that the heat-resistant sheet surfaces may contact each other, transferring an unevenness for signal onto the layer surface of said resin by pressurization of the superposed laminated sheets sandwiched between the mold cavities having unevenness on the surface under heating, and thereafter cooling and solidifying the resin.

DESCRIPTION OF THE PREFERRED EMBODIMENTS

In the following, the present invention is described in more detail.

The above object of the present invention can be accomplished by spreading a resin in a plastic state directly or through another layer on one surface or both surfaces of a heat-resistant sheet, adhering with solidification the resin onto the heat-resistant sheet while forming by transfer an uneven guide groove onto said resin and thereafter laminating an optical recording layer capable of recording by photoenergy on the surface having the uneven guide groove.

In the following, a method for preparing a thin type optical memory medium having an optical recording layer only on one surface of a heat-resistant sheet is described in detail.

First, a stamper having an uneven surface prepared by electroforming working on an original plate is placed on one inner surface of a pair of mold cavities. Further, on the inner surface of the other mold cavity or within the space through which the mold cavities are confronted with each other, a heat-resistant sheet is placed so as to be opposed to the stamper with an interval therefrom. Subsequently, while or after clamping the mold cavities, the resin in a plastic state is spread in the space portion constituted by the stamper and the heat-resistant sheet surface within said mold cavity to fill wholly the space portion with the resin. Said resin is transferred with the uneven guide groove on its surface with the above stamper and at the same time adhered with solidification onto the heat-resistant sheet. Thus, a substrate is prepared.

In the present invention, as the method for spreading the resin in a plastic state, there may be employed any of the compression molding method in which a softened resin is compressed in mold cavities while under clamping, the cast molding method in which a liquid resin is poured into clamped mold cavities and the injection molding method in which a heated thermo-plastic resin is injected into mold cavities.

Also, prior to the step of spreading the resin in a plastic state to be adhered to the heat-resistant sheet in the present invention, for further improvement of adhesion force thereof, a layer with strong adhesion (adhesion layer) may be previously provided on the heat-resistant sheet. This adhesion layer serves to not only improve the adhesive force but it also serves as protection for the heat-resistant sheet.

As the next step, an optical recording layer is laminated according to the vapor deposition method or various coating methods such as roll coating, did coating, etc., on the surface of the substrate where the guide groove exists, namely on the surface of the resin formed by spreading. According to the steps as described above, a thin type optical memory medium can be prepared.

For preparation of a thin type optical memory medium having optical recording layers on both surfaces according to the present invention, a pair of mold cavities having stampers arranged on the respective inner surfaces may be utilized, and its typical method is shown in Example 2 as described below. An optical memory medium having optical recording layers on both surfaces has specific features such that it is economical with greater information capacity per one sheet and also that warping of the medium itself becomes smaller owing to the symmetrical shapes of the front and back.

According to the method of the present invention, since a substrate is molded with different kinds of materials of the guide groove portion and the base portion therebeneath and yet a heat-resistant sheet with high strength previously molded is used as the base portion, molding of the substrate can be easily done if the base portion is not relatively made thicker than the guide groove portion. Therefore, according to the present method, the optical memory medium as a whole can be made thinner (see Examples 1 to 2).

Also, the present invention which can accomplish the above object comprises having the steps of super-posing two sheets of substrates having guide grooves prepared by spreading a resin under plastic state directly or through another layer on one surface of a heat-resistant sheet and adhering with solidification onto the heat-resistant sheet while forming by transfer unevenness for signal onto said resin so that said heat-resistant sheet surfaces may contact each other, and laminating optical recording layers capable of recording by photoenergy on the both external surfaces having the guide grooves.

In this embodiment of the present invention, first a stamper having an uneven surface prepared by electroforming working on an original plate is placed on the inner surface of one of a pair of mold cavities. Further, on the inner surface of the other mold cavity or within the space through which the mold cavities are opposed to each other, a heat-resistant sheet is placed with an interval from the stamper and as opposed thereto (step-1). Subsequently, while or after clamping the mold cavity, the resin under plastic state is spread in the space portion constituted by the stamper and the heat-resistant sheet surface within said mold cavities to fill wholly the space portion with the resin (step-2). Said resin is transferred with the uneven guide groove on its surface with the above stamper simultaneously with adhesion to the heat-resistant sheet. Thus, one sheet of substrate is prepared. Such method is practiced again to prepare two sheets of substrates (step-2'). Also, two sheets of substrates may be formed at the same time according to the following method. That is, stampers are placed on both inner surfaces of a pair of mold cavities, and a heat-resistant sheet having two sheets superposed on one another is arranged within the space through which the cavities are opposed to each other, followed by practicing the step similar to the step-2, whereby two sheets can be prepared at the same time.

Next, the two sheets of substrates obtained in the above steps are superposed on one another so that the heat-resistant sheets may contact each other (step-3). Both substrates are left to be unadhered. Then, on both surfaces of the superposed substrates, namely the surfaces where guide grooves are formed, optical recording layers capable of recording by photoenergy are laminated (step-4). Thus, two sheets of optical memory media are prepared at the same time. The recording layer may be formed by laminating the material as described below according to the vapor deposition method or various coating methods such as dip coating, roll coating, etc.

According to the method of the present invention, as described above, the substrate is molded with different kinds of materials in the guide groove portion and the base portion therebeneath, allowing a heat-resistant sheet with high strength and previously molded to be used as the base portion, molding of substrate easily done if the base portion is not made relatively thicker than the guide groove portion. Therefore, according to the present invention, the optical memory medium as a whole can be made thinner.

Also, since two sheets of optical recording layer can be formed at the same time, productivity can be improved. Further, in the present method, since the respective back faces of the two sheets of substrates are not exposed during lamination of the optical recording layer, it is not necessary at all to cover the back surfaces of the substrate with coverings, etc., even when utilizing dip coating as the lamination method, whereby dip coating can be practiced with extreme ease. (See Example 3).

Also, the above object of the present invention can be accomplished by laminating on one surface or both surfaces of a heat-resistant sheet a resin having a lower heat distortion temperature than said heat-resistant sheet (hereinafter abbreviated as readily deformable resin) directly or through another layer, transferring an uneven guide groove on the surface of said resin layer by pressurization of the laminated sheet obtained between the mold cavities having unevenness on the surface under heating and thereafter laminating an optical recording layer capable of recording by photoenergy on the surface having said guide groove.

In this embodiment of the present invention, first a readily deformable resin is laminated on one surface or both surfaces of a heat-resistant sheet to form a laminated sheet. As the laminating method, there may be employed the method in which the readily deformable resin is dissolved in a solvent, etc., and the solution is coated on a heat-resistant sheet by roll coating and the method in which the readily deformable resin is formed into a film and laminated onto a heat-resistant sheet. Also, the readily deformable resin may be plastered with the heat-resistant sheet through a intermediary adhesion layer. According to this method, sufficiently great adhesion force can be obtained and the heat-resistant sheet can be protected with the adhesion layer. Next, the above laminated sheet is pressurized by sandwiching under heat to transfer the uneven guide groove onto the surface of the readily deformable resin layer to provide a substrate. Pressurization of the laminated sheet having the readily deformable resin on both surfaces by sandwiching may be practiced by use of a pair of mold cavities having unevenness on the inner surfaces respectively. Pressurization of a laminated sheet having the readily deformable resin layer only on one surface may be practiced by use of a pair of mold cavities having unevenness only on one inner surface thereof.

The means for heating during pressurization by sandwiching may be provided in the mold itself or prepared separately from the mold.

Subsequently, on the surface of the substrate where the guide groove is transferred, namely on the readily deformable resin layer surface, an optical recording layer capable of recording by photoenergy is laminated according to various lamination methods such as the vapor depositon method, the roll coating method, the dip coating method, etc. According to the steps as described above, a thin type optical memory medium can be prepared.

An optical memory medium having optical recording layers on both surfaces has the advantages such that it is economical with greater information capacity per one sheet and also that warping of the optical memory medium itself becomes smaller due to the symmetrical shapes of front and back.

According to the method of the present invention, as described above, since the substrate is molded with different kinds of materials of the guide groove portion and the base portion therebeneath, and yet a heat-resistant sheet with high strength previously molded is used as the base portion, formation of the substrate can be easily done, if the base portion is not made relatively thicker than the guide groove portion.

Also, in the present invention, since no step of filling the starting material resin within the mold cavity is required as in injection molding, the restriction with respect to the cavity width set in the mold cavity is very small, and therefore the substrate can be made thinner also in this respect.

For the above reasons, according to the present method, the optical memory medium as a whole can be made thinner (see Examples 4 and 5).

Also, the present invention capable of accomplishing the above object relates to a method for preparing a thin type optical memory medium, which comprises having the steps of laminating on one surface of a heat-resistant sheet a resin having a lower heat distortion temperature than said heat-resistant sheet directly or through another layer, pressurizing the laminated sheet obtained under heat by sandwiching between mold cavities having unevenness on the surface to transfer the uneven guide groove onto the surface of said resin layer, superposing the two sheets of the laminated sheets thus formed so that the heat-resistant sheet surfaces may contact each other, and laminating optical recording layers capable of recording with photoenergy on both surfaces having said guide grooves.

In this embodiment of the present invention, first a readily deformable resin is laminated on one surface of a heat-resistant sheet to form a laminated sheet. As the lamination method, there may be employed the method in which the readily deformable resin is dissolved in a solvent, etc., and a resultant solution is coated onto a heat-resistant sheet by roll coating or the method in which the readily deformable resin is formed into a film and laminated onto the heat-resistant sheet, etc. Also, the readily deformable resin and the heat-resistant sheet may be plastered through an intermediary adhesion layer. According to this method, sufficiently great adhesive force can be obtained and also the heat-resistant sheet can be protected with the adhesion layer.

By practicing again the method as described above, two laminated sheets are formed. As another method for forming two laminated sheets, there may be also employed the method in which two heat-resistant sheets are superposed on one another and dip coating is effected on both surfaces thereof. This method is preferable in that the two laminated sheets can be obtained at the same time.

As the next step, on each readily deformable resin surface of the two laminated sheets, an uneven guide groove is transferred to form two substrates. As in the transfer method, there may be employed the method in which the laminated sheet is pressurized one by one by sandwiching between a pair of mold cavities of which only one inner surface is shaped in unevenness or the method in which the two laminated sheets are superposed on one another so that the respective heat-resistant sheets may contact each other and pressurized under heating by sandwiching between a pair of mold cavities of which the respective inner surfaces have unevenness. According to the latter method, there is the advantage of smaller warping of the substrate because pressurization by sandwiching can be done under the symmetrical state of front and back.

Next, the two substrates are superposed so that the respective heat-resistant sheet surfaces may contact each other, and optical recording layers capable of recording by photoenergy are laminated on the both surfaces thereof, namely readily deformable resin layer surfaces provided with the guide grooves, thereby forming two sheets of optical memory media at the same time. Lamination of the optical recording layer may be practiced by laminating the material as described below according to the vapor deposition method or various coating methods such as dip coating, roll coating, etc.

In the method of the present invention, as described above, since the substrate is molded with different kinds of materials of the guide groove portion and the base portion therebeneath and yet a heat-resistant sheet with high strength previously molded is used as the base portion, molding of the substrate can be easily done if the base portion is not made relatively thicker than the guide groove portion.

Also, in the present invention, no step of filling the starting material resin within the mold cavity is required as in injection molding, and therefore a limitation with respect to the cavity width set in the mold cavity can be very small, and the substrate can be made thinner also in this respect. For the above reasons, according to the present method, the optical memory medium as a whole can be also made thinner.

Also, since two sheets of optical recording layers can be formed at the same time, productivity can be improved.

Further, in the present method, since the respective back faces of the two substrates are not exposed during lamination of optical recording layers, it is not necessary at all to cover the back faces of the substrate with coverings, etc., even in the case of utilizing dip coating as the lamination method, dip coating can be practiced with extreme ease (see Example 6).

Further, the method for preparing a thin type disc of the present invention which can accomplish the above object comprises spreading a resin under plastic state directly or through another layer on the respective outer surfaces of a heat-resistant sheet comprising two sheets superposed on one another and adhering the resin with solidification onto the heat-resistant sheet while forming by transfer grooves of unevenness for embodying a signal onto said resin.

In this embodiment of the present invention, first stampers each having an uneven surface prepared by electroforming working on an original plate are placed on both inner surfaces of a pair of mold cavities. Further, within a space through which a pair of mold cavities are opposed to each other, two sheets of superposed heat-resistant sheets are placed with an interval from both stampers and as opposed thereto. The two heat-resistant sheets are superposed on one another but left to be unadhered.

Next, while or after clamping the mold cavities, in the space constituted by the stampers and the heat-resistant sheet surfaces within said mold cavities, the resin under plastic state is spread to fill the space with the resin. Said resin is transferred with unevenness for signal on its surface with the above stampers simultaneously with adhesion by solidification onto the heat-resistant sheets, whereby two sheets of thin type discs can be formed at the same time. In the present invention, as the method for spreading the resin under plastic state, there may be employed any of the compression molding method in which a softened resin is compressed by mold cavities under clamping, the cast molding method in which a liquid resin is poured into clamped mold cavities and the injection molding method in which a heated thermoplastic resin is injected into mold cavities.

Also, prior to the step of spreading the resin under plastic state to be adhered onto the heat-resistant sheet, for further improvement of adhesive force thereof, a layer with strong adhesiveness (adhesion-layer) may be also previously provided on the heat-resistant sheet. This adhesion layer serves to not only to improve adhesion between layers but also protects the heat-resistant sheet.

In the method of the present invention, since a thin type disc is molded with the use of different kinds of materials of the uneven portion for signal and the base portion therebeneath, and yet a heat-resistant sheet with high strength previously molded as the base portion, formation of the disc can be easily done if the base portion is not made relatively thicker than the unevenness portion. Thus, the disc can be made thinner according to the present method.

Further, the present invention has the following advantages:

1 since two sheets of thin type discs can be prepared at the same time, productivity is high; and 2 since the preparation steps proceed under the state where two heat-resistant sheets are arranged symmetrically, the strain at the signal portion formed on said heat-resistant sheet in the intermediate spreading step can be small. (see Example 7).

Also, the above object of the present invention can be accomplished by laminating on each surface of two heat-resistant sheets a resin having a lower heat distortion temperature than said heat-resistant sheet (hereinafter abbreviated as readily deformable resin) directly or through another layer to form two laminated sheets, superposing said both laminated sheets so that the heat-resistant sheet surfaces may contact each other, transferring an unevenness for signal onto the layer surface of said resin by pressurization of the superposed laminated sheets under heating by sandwiching between the mold cavities having unevenness on the surface, and thereafter cooling and solidifying the resin.

In this embodiment of the present invention, first a readily deformable resin is laminated on one surface of the heat-resistant sheet to form a laminated sheet. As the lamination method, there may be employed the method, in which the readily deformable resin is dissolved in a solvent, etc., and the resultant solution is coated onto a heat-resistant sheet by roll coating or the method in which the readily deformable resin is formed into a film and laminated onto heat-resistant sheet, etc. Also, the readily deformable resin may be plastered with a heat-resistant sheet through an adhesion layer. According to this method, sufficiently great adhesive force can be obtained, and also the heat-resistant sheets can be protected with the adhesion layer.

By practicing again the method as described above, two laminated sheets are formed. Subsequently, the two laminated sheets are superposed on one another so that the heat-resistant sheets may contact each other. In this case, both sheets are not fixed with an adhesive, etc.

As the next step, both surfaces of the superposed laminated sheets, namely the readily deformable resin surfaces are pressurized under heating by sandwiching to transfer the unevenness for signal on both surfaces. The pressurization by sandwiching may be practiced by use of a pair of mold cavities having unevenness respectively on the inner surfaces. The heating means during pressurization by sandwiching may be provided in the mold itself, or separately from the mold.

After the above transfer step, via cooling and solidification, two sheets of thin type discs are obtained at the same time.

The above thin type disc can be itself used as high density information recording disc, and also an optical disc which can be also used for optical reproduction system can be obtained by applying post-treatment such as metal vapor deposition, coating of light-absorbing dye, etc. In the method of the present invention, as described above, since the uneven portion for signal and the base portion therebeneath are molded with different kinds of materials, and yet a heat-resistant sheet with high strength previously molded is used as the base portion, molding can be easily done if the base portion is not made relatively thicker than the uneven portion for signal.

Also, in the present invention, no step of filling the starting material resin in the mold cavity is required as in injection molding, and therefore limitation with respect to the cavity width set in the mold cavity is extremely small, and the substrate can be made thinner also in this respect.

For the above reasons, according to this method, the optical memory medium as a whole can be made thinner.

Further, the present invention has the following advantages:

1 since two sheets of thin type discs are prepared at the same time, productivity is high;

2 since two heat-resistant sheets are pressurized by sandwiching under the state symmetrically arranged, unbalance in force applied on the respective portions is small, whereby the respective discs after completion have little strain. (see Example 8)

The heat-resistant sheet to be used in the present invention, namely the film to be used as the base is flexibly capable of standing the temperature of the resin under plastic state during formation of unevenness pattern, preferably a thermosetting heat-resistant film. Typical examples of the thermosetting heat-resistant film may include polyimide film, polyamideimide film, epoxy resin film, silicone resin film, polyesterimide film, polyester film and fluorine resin films such as tetrafluoroethylene-hexafluoropropylene copolymer film, tetrafluoroethylene-perfluoroalkyl vinyl ether copolymer film, etc. Also, as the heat-resistant sheet, a material which is not flexible such as a plate can be used.

As the resin to be used in the present invention for forming a guide groove on the surface, thermoplastic resins are preferred. Typical examples of the thermoplastic resin may include polysulfone, polyolefins, polyolefin copolymers such as ethylene-vinyl acetate copolymer, ethylene-acrylate copolymer, ethylene-propylene copolymer, etc., polyolefin halides, vinyl chloride copolymers such as vinyl acetate-vinyl chloride copolymer, vinyl chloride-acrylonitrile copolymer, etc., vinylidene chloride copolymers such as vinylidene chloride-vinyl chloride copolymer, vinylidene chloride-vinyl chrolide-acrylonitrile copolymer, etc., polystyrene, styrene copolymers such as styrene-acrylonitrile copolymer (AS resin), styrene-acrylonitrile-butadiene copolymer (ABS resin), etc., p-methylstyrol, 2,5-dichlorostyrol, vinylanthracene, etc. or copolymers thereof (styrol copolymers), cumarone and indene or copolymers thereof with styrene, terpene resin or picolite, acrylic resins, polyacrylonitrile, acrylonitrile copolymers such as acrylonitrile-vinyl acetate copolymer, acrylonitrile-vinyl pyridine copolymer, acrylonitrile-methyl methacrylate copolymer, etc., polyacrylamide, diacetone acrylamide polymer prepared by reacting acetone with acrylonitrile, polyvinyl acetate, copolymers of vinyl acetate with acrylate ester, vinyl ester, vinyl-ether or ethylene, etc., polyvinyl ether, polyamide, thermoplastic polyesters, polyvinyl alcohols, or polyvinyl acetal type resins, polyurethane, polyvinylcarbazole with a number average molecular weight of 6000 or less or polyvinylcarbazole copolymers of vinylcarbazol and ethylene or styrene, etc., and other nitrogen containing vinyl polymers, polybutadiene, or diene type polymers such as butadiene-styrene copolymer or isoprene-isobutylene copolymer, etc., polyether, polycarbonate, polyethyleneimines, cellulose type resin or blends of two kinds or more of the above resins, or blends with other thermoplastic resins.

As the material for the optical recording layer to be used in the present invention, any kind of materials is useful, provided it can form a thin film capable of recording by light. For example, metals such as aluminum, inorganic compounds such as bismuth, tellurium oxide or chalcogenide type compounds may be employed. These materials can be made into optical recording layers generally be sputtering or vacuum vapor deposition. Also, as other optical recording materials, those composed mainly of light-absorbing coloring matter may be employed. Examples of light-absorbing coloring matter may include azo, stilbene, phthalocyanine type direct dyes including cyanine, melocyanine, triphenylmethane, naphthoquinone, xanthene, squalium and azulene, etc.; acidic dyes such as azo; anthraquinone, triphenylmethane, xanthene and azine type; basic dyes such as cyanine, azo, azine, triphenylmethane type; mordant acidic mordant dyes such as azo, anthraquinone, xanthene, triphenylmethane type; vat dyes such as anthraquinone, indigoid type; oil soluble dyes such as azo, anthraquinone, phthalocyanine, triphenylmethane type, etc. These can be formed into optical recording layers according to various coating methods or the like as mentioned above.

EXAMPLE 1

Figure 1:
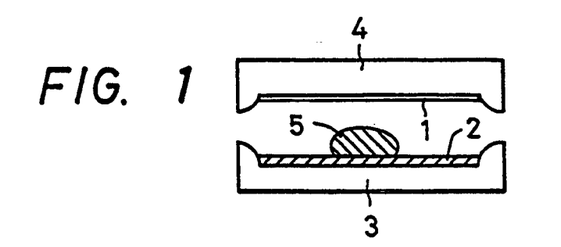
FIG. 1 is a sectional view showing the state in which a resin in a plastic state is fed to one side of a heat-resistant sheet.
Figure 2:
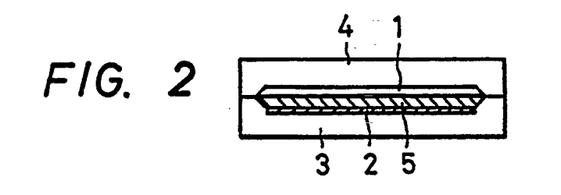
FIG. 2 is a sectional view showing the state in which said resin is spread within a mold.

In FIG. 1, a stamper 2 having unevenness on the surface prepared by application of electroforming on an original plate was placed in one mold cavity 3, and a polyimide tape with a thickness of 50 μm having a thermal softening temperature of 300° C. or higher was placed in the other cavity mold 4 as the heat-resistant sheet 1. To the center of the stamper was fed a polymethyl methacrylate resin 5 having a number average molecular weight of 80000 softened to be under plastic state, and said resin 5 was compressed with the mold cavities 3 and 4. Said resin 5 flowed from the center of the mold cavity toward the circumferential direct ion until spread wholly within the mold cavity as shown in FIG. 2 to be adhered to the heat-resistant sheet 1 simultaneously with formation of uneven guide groove on its surface with the stamper 2.

A 1% solution of a light-absorbing dye having the structural formula shown below (solvent . . . diacetone alcohol:isopropyl alcohol=2:1 parts by weight):

was applied on the resin having the guide groove formed thereon according to the roll coating method, followed by evaporation of the solvent to form an optical recording layer. Thus, a thin type optical memory medium was obtained.

EXAMPLE 2

Figure 3:
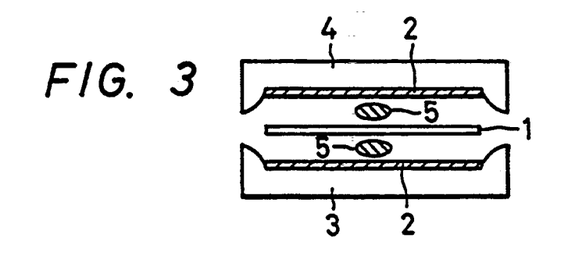
FIG. 3 is a sectional view showing the state in which a resin under plastic state is fed to both surfaces of a heat-resistant sheet.
Figure 4:
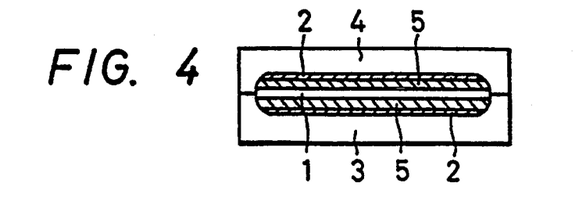
FIG. 4 is a sectional view of the state in which said resin is spread within a mold.

In FIG. 3, two stampers 2 having unevenness on the surface prepared by application of electroforming on original plates were placed respectively on both surfaces of the mold cavities 3, 4 and a polyimide tape with a thickness of 50 μm having a thermal softening temperature of 300° C. or higher was arranged as the heat-resistant sheet 1 between the two stampers. To both sides near the center of the heat-resistant sheet 1 was fed a softened polymethyl methacrylate resin 5 having a number average molecular weight of 80000 and said resin 5 and the heat-resistant sheet 1 were compressed from both sides with mold cavities 3 and 4. The resin 5 flowed from the center of the mold cavity toward the circumferential direction until spread wholly within the mold cavities as shown in FIG. 4 to be adhered to the heat-resistant sheet 1, simultaneously with formation of a guide groove in shape of an uneven pattern on its surface with the stampers 2. On both surfaces of the substrates thus formed, the same light-absorbing coloring matter solution as in Example 1 was then laminated according to dip coating, followed by evaporation of the solvent to obtain an optical memory medium.

The thicknesses of the memory media completed in Examples 1 and 2 were as follows.

| | Thickness (μm) |
|---|---|
| Example 1 | 90 |
| 2 | 130 |

EXAMPLE 3

Figure 5:
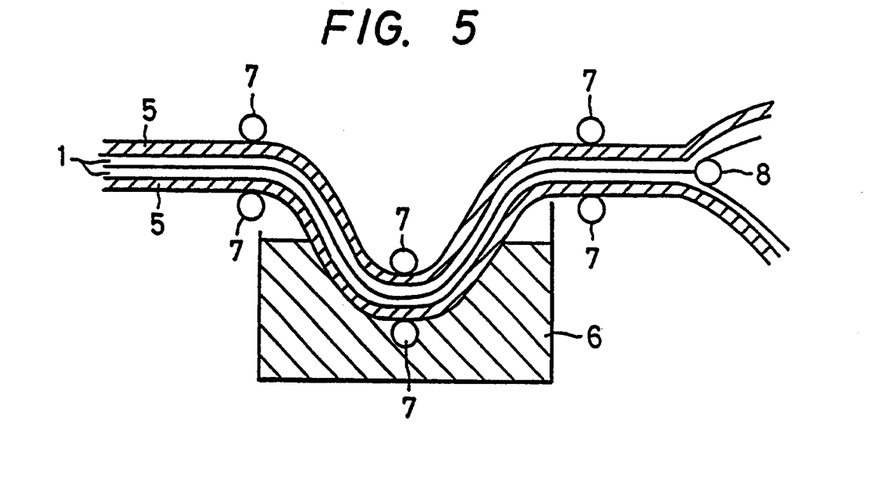
FIG. 5 is a view illustrating the coating step of optical recording layer.

In FIG. 1, a stamper 2 having unevenness on the surface prepared by electroforming on an original plate was placed in one mold cavity 3, and a polyimide tape with a thickness of 50 μm having a thermal softening temperature of 300° C. higher was placed in the other cavity mold 4 as the heat-resistant sheet 1. To the center of the stamper 2 was fed a softened polymethyl methacrylate resin 5 having a number average molecular weight of 80000, and said resin 5 was compressed with the mold cavities 3 and 4. Said resin 5 flowed from the center of the mold cavity toward the circumferential direction until spread wholly within the mold cavity as shown in FIG. 2 to be adhered to the heat-resistant sheet 1 simultaneously with formation of uneven guide groove on its surface with the stamper 2. Two sheets of substrates prepared in the above steps were superposed on one another so that one surface of the heat-resistant sheet may be contacted as shown in FIG. 5 and, the laminate obtained was subjected to dip coating of an optical recording layer on the guide groove by passing through a 1% solution of the above light-absorbing dye 6 (solvent ... diacetone alcohol: isopropyl alcohol=2:1 parts by weight) with the roll 7, and thereafter the two sheets were separated by the separating roll 8 to obtain two sheets of thin type optical discs at same time, Each thin type optical disc had a thickness of 90 μm.

EXAMPLE 4

Figure 6:
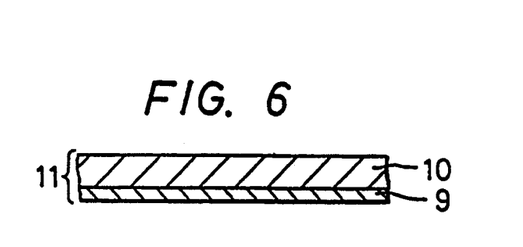
FIG. 6 and FIG. 8 are each sectional view of a sheet having polymethyl methacrylate laminated on a polyimide film.
Figure 7:
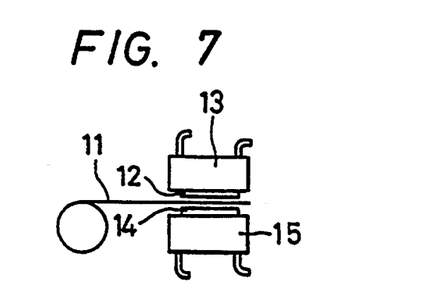
FIG. 7 and FIG. 9 are each sectional view showing the step of transferring the signal of unevenness to said laminated sheet.

A polymethyl methacrylate having a heat distortion temperature of 85° C. and a number average molecular weight of 80000 (readily deformable resin) was dissolved in toluene, and the resultant solution was applied to a uniform thickness according to roll coating on a film (heat resistant sheet) 9 with a thickness of 50 μm and having a heat distortion temperature of 300° C. or higher (CAPTONE polyimide film produced by Toray K,K. in FIG. 6. When the polyimide film 9 coated with said solution was dried by heating at 100° C. for 1 hour, a polymethyl methacrylate layer 10 with a thickness of 50 μm remained after evaporation of toluene to give a laminated sheet 11. In FIG. 7, as the press portion, a stamper 12 having an uneven surface prepared by electroforming an original plate was mounted in the mold cavity 13, and a cushion layer 14 in the mold cavity 15. After the laminated sheet 11 was pressed by heating by the above press portion to transfer the uneven guide groove onto the polymethyl methacrylate layer 10, the resin was cooled and solidified to provide a substrate.

Then, a 1% solution of the above light-absorbing dye (solvent ... diacetone alcohol:isopropyl alcohol=2:1 parts by weight) was applied on the substrate by roll coating, followed by evaporation of the solvent to form an optical recording layer. Thus, a thin type optical memory medium was obtained.

EXAMPLE 5

Figure 8:
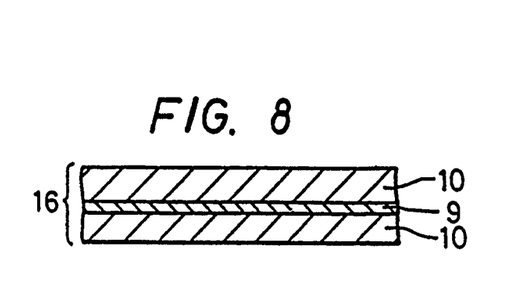
Figure 9:
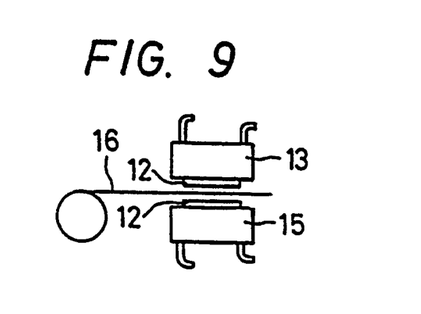

A polymethyl methacrylate having a heat distortion temperature of 85° C. and a number average molecular weight of 80000 (readily deformable resin) was dissolved in toluene, and the resultant solution was applied to a uniform thickness by roll coating on both surfaces of a film (heat-resistant sheet) 9 with a thickness of 50 μm having a heat distortion temperature of 300° C. or higher (CAPTONE polyimide film produced by Toray K.K.) shown in FIG. 8. When the polyimide film 9 coated with said solution was dried by heating at 100° C. for 1 hour, polymethyl methacrylate layers 10 with a thickness of 50 μm remained on both surfaces of the polyimide film 9 after evaporation of toluene to give a laminated sheet 16. In FIG. 9, as the press portions, stampers 12 having uneven surfaces prepared by electroforming original plates were mounted respectively in mold cavities 13 and 15. After the laminated sheet 16 was pressed by the above press portions to transfer uneven guide grooves onto the polymethyl methacrylate layers 10, the resin was cooled and solidified to provide a substrate. Then, the same light-absorbing coloring matter solution as in Example 4 was applied on both surfaces of the substrate by dip coating, followed by evaporation of the solvent to form an optical recording layer. Thus, a thin type optical memory medium was obtained. The optical memory media prepared in Examples 4 and 5 had thicknesses shown below.

|           | Thickness (mm) |
|-----------|----------------|
| Example 4 | 0.10           |
| 5         | 0.15           |

EXAMPLE 6

Figure 10:
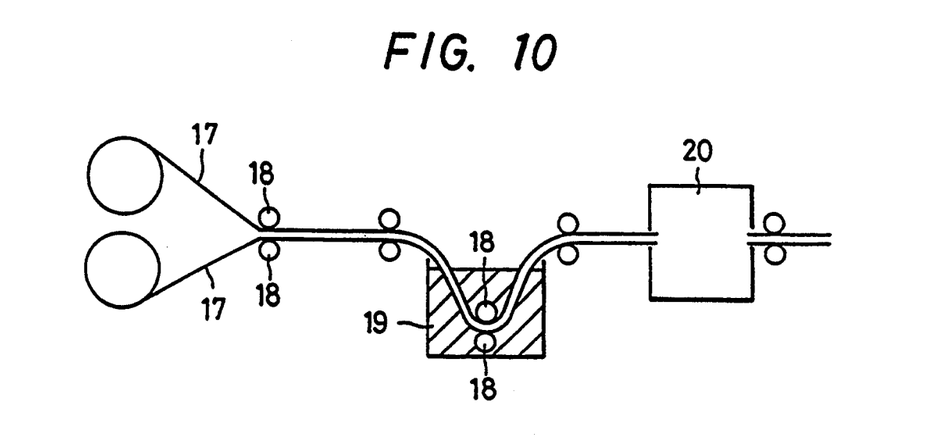
FIG. 10 is a view illustrating the step of coating polymethyl methacrylate onto a polyimide film.
Figure 11:
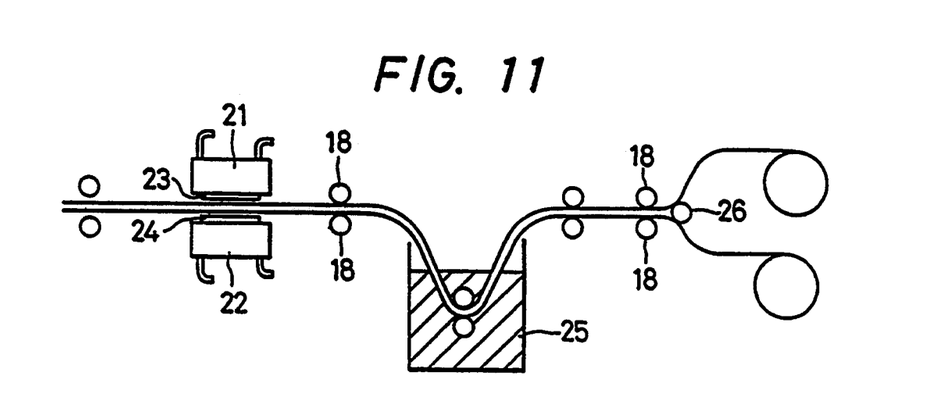
FIG. 11 is a view illustrating the step of transferring the guide groove and coating the light-absorbing dye.

As shown in FIG. 10, two sheets of a film 17 with a thickness of 50 μm having a heat distoration temperature of 300° C. (CAPTONE film produced by Toray K.K.) were contacted with each other by a pressure roll 18 and passed through a solution 19 containing a polymethyl methacrylate having a heat distortion temperature of 85° C. and a number average molecular weight of 80000 dissolved in toluene to coat the both surfaces (each one surface of the two sheets of the polyimide film) with the polymethyl methacrylate. Then, toluene was evaporated in a heating surface 20 to laminate a polymethyl methacrylate layer with a thickness of 50 μm, thus forming two sheets of laminated sheets (FIG. 10). Thereafter, as shown in FIG. 11, guide grooves were transferred onto the polymethyl methacrylate layers by pressing under heating with the press portions having stampers 23 and 24 having unevenness on the surface prepared by electroforming original plates mounted in the mold cavities 21 and 22, respectively, followed by cooling and solidification.

Subsequently, by passing through a 1% solution of the above light-absorbing dye 25 (solvent . . . diacetone alcohol:isopropyl alcohol=2:1 parts by weight), the light-absorbing dye was coated on the guide grooves, followed by evaporation of the solvent to form optical recording layers. Then, the two sheets were separated by a separating roll 26 to obtain two sheets of thin type optical memory media. Each medium and a thickness of 0.1 mm.

EXAMPLE 7

Figure 12:
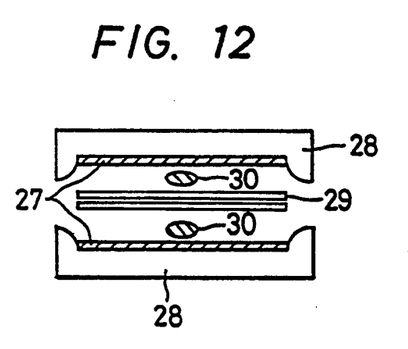
FIG. 12 and FIG. 13 are each schematical view showing an example of the present method.
Figure 13:
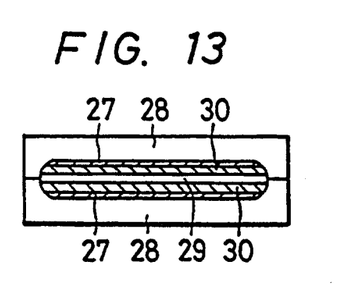

In FIG. 12, two stampers 27 having unevenness on the surface prepared by application of electroforming working on original plates were placed on both surfaces of the mold cavity 28, and two sheets of a polyimide tape with a thickness of 50 μm having a thermal decomposition temperature of 300° C. or higher were placed superposed on one another as the heat-resistant sheet 29 between the two stampers 27. To both sides near the center of the two sheets of heat-resistant sheet 29 was fed a softened polymethyl methacrylate resin 30 having a number average molecular weight of 80000, and said resin 30 and the heat-resistant sheet 29 were compressed by the mold cavity 28. Said resin 30 flowed from the center of the mold cavity toward the circumference until spread wholly within the mold cavity as shown in FIG. 13 to be adhered and solidified to the two sheets of heat-resistant sheet 29, simultaneously with formation of an uneven pattern on their surfaces by the stamper 27.

EXAMPLE 8

Figure 14:
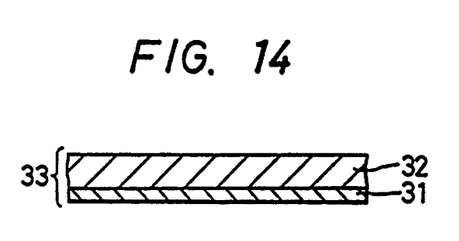
FIG. 14 is a sectional view of a sheet having polymethyl methacrylate laminated on a polyimide film.
Figure 15:
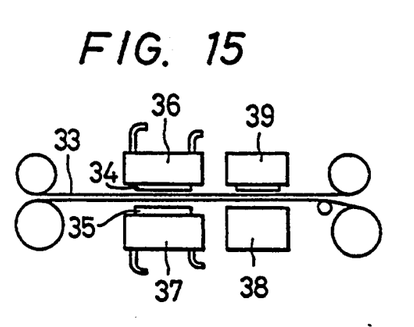
FIG. 15 is a sectional view showing the step for transferring the signal of unevenness to said laminated sheet.

A polymethyl methacrylate having a heat distortion temperature of 85° C. and a number average molecular weight of 80000 (readily deformable resin) was dissolved in toluene, and the resultant solution was applied to a uniform thickness by roll coating on one surface of a polyimide film (heat-resistant sheet) 31 with a thickness of 50 μm having a heat-distortion temperature of 300° C. or higher (CAPTONE polyimide film produced by Toray K.K.) shown in FIG. 14. When the polyimide film 31 coated with said solution was dried by heating at 100° C. for 1 hour, a polymethyl methacrylate layer 32 with a thickness of 50 μm remained on one surface of the polyimide film after evaporation of toluene to give a laminated sheet 33. The above steps were practiced again to form another sheet of laminated sheet 33. In FIG. 15, stampers 34 and 35 having uneven surface prepared by electorforming working from original plates were mounted in mold cavities 36 and 37. Details of stampers 34 and 35 are seen in FIG. 16, wherein 41 is the base of the stamper and 40 is the stamping section of the stamper. The two sheets of superposed laminated sheets 33 were pressed under heating by the above press portions to transfer unevenness for signal onto both polymethyl methacrylate layers 32, followed by cooling and solidification, and two sheets of disc equipped with unevenness for signal were punched out at the punching section 38 and 39 at the same time. The sheets after punching out were wound up.

What is claimed is:

1. An optical memory medium comprising:
   (i) a heat-resistant sheet comprising a thermosetting resin at least one surface of which has thereon a readily deformable resin layer comprising a thermoplastic resin, wherein said readily deformable resin layer has an uneven guide groove on its surface; and
   (ii) an optical recording layer formed over said at least one surface of said heat-resistant sheet,
   wherein the thickness of said heat-resistant sheet is equal to the thickness of said readily deformable resin layer, or the thickness of said heat-resistant sheet is smaller than the thickness of said readily deformable resin layer.

2. An optical memory medium according to claim 1, wherein the uneven guide groove is formed by transfer using a metal mold having unevenness on the surface.

3. An optical memory medium according to claim 1, wherein the thermosetting resin is a resin film selected from the group consisting of polyimide film, polyamideimide film, epoxy resin film, silicone resin film, polyesterimide film, polyester film, and fluorine containing resin film.

4. An optical memory medium according to claim 1, wherein the plastic resin layer is formed by spreading a resin under plastic state.

5. An optical memory medium according to claim 1, wherein the plastic resin layer is formed by laminating a resin having a heat deformation temperature lower than the heat-resistant sheet.

6. An optical memory medium according to claim 1, wherein spreading of the resin under plastic state is performed by a method selected from the group consisting of compression molding, cast molding, and injection molding.

7. An optical memory medium according to claim 1, wherein an adhesive layer is present between the heat-resistant sheet and the plastic resin layer.

8. An optical memory medium according to claim 1, wherein the entire memory medium thickness is 1 mm or less.

9. An optical memory medium according to claim 1, wherein said readily deformable resin layer is laminated on both surfaces of said heat-resistant sheet.

* * * * *

UNITED STATES PATENT AND TRADEMARK OFFICE
CERTIFICATE OF CORRECTION

PATENT NO. : 5,378,516

DATED : January 3, 1995

INVENTOR(S) : Kohzoh Arahara

It is certified that error appears in the above-indentified patent and that said Letters Patent is hereby corrected as shown below:

COLUMN 1:

Line 8, "No. 07/014,78.5" should read --No. 07/014,785,--.

Line 42, "could" should be deleted.

Line 43, "for" should read --to meet--.

COLUMN 2:

Line 9, "sheets of" should be deleted.

COLUMN 3:

Line 4, "working" should be deleted.

COLUMN 4:

Line 10, "working" should be deleted.

Line 52, "molding of" should read --making the molding of--.

UNITED STATES PATENT AND TRADEMARK OFFICE
CERTIFICATE OF CORRECTION

PATENT NO. : 5,378,516
DATED : January 3, 1995
INVENTOR(S) : Kohzoh Arahara

It is certified that error appears in the above-indentified patent and that said Letters Patent is hereby corrected as shown below:

<u>COLUMN 6:</u>

Line 60, "the" should be deleted.

<u>COLUMN 7:</u>

Line 38, "working" should be deleted.

<u>COLUMN 8:</u>

Line 14, "1" should read --(1)--.

Line 16, "2" should read --(2)--.

<u>COLUMN 9:</u>

Line 21, "1" should read --(1)--.

Line 22, "high;" should read --high; and--.

Line 23, "2" should read --(2)--.

UNITED STATES PATENT AND TRADEMARK OFFICE
CERTIFICATE OF CORRECTION

PATENT NO. : 5,378,516
DATED : January 3, 1995
INVENTOR(S) : Kohzoh Arahara

It is certified that error appears in the above-indentified patent and that said Letters Patent is hereby corrected as shown below:

<u>COLUMN 10:</u>

Line 21, "be" should read --by--.

Line 46, "application of" should be deleted.

Line 59, "direct ion" should read --direction--.

<u>COLUMN 11:</u>

Line 25, "application of" should be deleted.

<u>COLUMN 13:</u>

Line 13, "(CAPTONE" should read --(CAPTONE polyimide--.

Line 18, "to" should read --to thereby--; and "the" should be deleted.

Signed and Sealed this

Eleventh Day of July, 1995

Attest:

BRUCE LEHMAN

*Attesting Officer*   *Commissioner of Patents and Trademarks*